United States Patent
Miyashiro

(10) Patent No.: US 7,681,682 B2
(45) Date of Patent: Mar. 23, 2010

(54) STRADDLE-TYPE VEHICLE

(75) Inventor: Shidehiko Miyashiro, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 68 days.

(21) Appl. No.: 11/768,100

(22) Filed: Jun. 25, 2007

(65) Prior Publication Data
US 2008/0011534 A1    Jan. 17, 2008

(30) Foreign Application Priority Data
Jun. 26, 2006   (JP)   ............................. 2006-175939

(51) Int. Cl.
*B62K 11/00* (2006.01)
(52) U.S. Cl. ...................... 180/219; 280/835
(58) Field of Classification Search ................. 180/218, 180/219; 280/835
See application file for complete search history.

(56) References Cited

U.S. PATENT DOCUMENTS

| | | | | |
|---|---|---|---|---|
| 4,444,373 A | * | 4/1984 | Hayashi | ....................... 248/544 |
| 4,469,190 A | * | 9/1984 | Yamaguchi | ................. 180/219 |
| 6,357,424 B1 | * | 3/2002 | Sonoda et al. | ............... 123/509 |
| 6,401,750 B2 | * | 6/2002 | Tokunaga | .............. 137/565.34 |
| 6,641,169 B2 | * | 11/2003 | Fukunaga et al. | ............ 280/835 |
| 7,401,597 B2 | * | 7/2008 | Koike et al. | .................. 123/509 |
| 7,416,220 B2 | * | 8/2008 | Nakazawa et al. | ........... 280/835 |
| 7,422,243 B2 | * | 9/2008 | Kudo et al. | .................. 280/834 |
| 2003/0075659 A1 | * | 4/2003 | Fukunaga et al. | ......... 248/309.1 |
| 2006/0065459 A1 | * | 3/2006 | Nakazawa et al. | ........... 180/219 |
| 2006/0273572 A1 | * | 12/2006 | Yamamura | ................... 280/834 |
| 2007/0089922 A1 | * | 4/2007 | Iwasaki | ...................... 180/219 |

FOREIGN PATENT DOCUMENTS

JP    2002-513713    5/2002

* cited by examiner

*Primary Examiner*—Lesley Morris
*Assistant Examiner*—Tashiana Adams
(74) *Attorney, Agent, or Firm*—Hogan & Hartson LLP

(57) ABSTRACT

A straddle-type vehicle that has a fuel pump mounted on the bottom of a fuel tank disposed above an engine provides simplified maintenance and cleaning of the upper portion of the engine and its peripheral parts. A fuel tank support section that connects a fuel tank such that the fuel tank can turn on a connection bolt. The fuel tank support section connects a body frame to a front end section of the fuel tank. A fuel injection device is disposed under a rear end section of the fuel tank.

8 Claims, 7 Drawing Sheets

STRADDLE-TYPE VEHICLE

RELATED APPLICATIONS

This application claims the benefit of priority under 35 USC 119 of Japanese patent application no. 2006-175939, filed on Jun. 26, 2006, which application is hereby incorporated by reference in its entirety.

BACKGROUND OF THE INVENTION

1. Field of the Invention

The present invention relates to a straddle-type vehicle, and particularly to a straddle-type off-road vehicle frequently requiring maintenance and cleaning of the upper portion of an engine and its peripheral parts.

2. Description of Related Art

Straddle-type vehicles optimized for off-road traveling or so-called straddle-type off-road vehicles have recently used electronically controlled fuel injection devices (for example, see pp. 38-39 and FIG. 19 of JP-T-2002-513713, which is a published Japanese translation of a PCT application).

In a straddle-type off-road vehicle using such a fuel injection device, a fuel pump that supplies fuel to the fuel injection device is mounted in a fuel tank disposed above the engine. In order to prevent the fuel pump from being damaged, for example, when the straddle-type off-road vehicle rolls over, the fuel pump is mounted at the center of the bottom of the fuel tank.

A fuel hose that feeds pressurized fuel discharged out of the fuel pump to the fuel injection device (an injector) and a wiring coupler that bundles wiring lines including a power supply line, are connected to the fuel pump. A fuel hose connector capable of engaging and disengaging the fuel hose is provided at some point along the fuel hose.

In the straddle-type off-road vehicle described above, maintenance or cleaning of the upper portion of the engine and its peripheral parts requires removal of the fuel tank disposed above the engine. Removal of the fuel tank to permit such cleaning is more often necessary in an off-road vehicle than in a general-purpose straddle-type vehicle that is not used for off-road traveling.

To remove the fuel tank, it is necessary to unlock the fuel hose connector provided at some point along the fuel hose and disengage the wiring coupler, both of which are connected to the fuel pump mounted at the center of the bottom of the fuel tank. It is quite cumbersome to unlock the fuel hose connector and disengage the wiring coupler while supporting the fuel tank.

SUMMARY OF THE INVENTION

The invention has been made in view of such circumstances and provides a straddle-type vehicle that has a fuel pump mounted in a fuel tank disposed above an engine and allows a user to more easily carry out maintenance and cleaning of the upper portion of the engine and its peripheral parts.

In one embodiment of the invention, a straddle-type vehicle includes an engine mounted on a body frame. A fuel tank is disposed above the engine. A fuel pump is mounted in the fuel tank. A part such as a fuel injection device is connected to the fuel pump. A fuel tank support section supports the fuel tank such that the fuel tank can turn. The fuel tank support section supports one end section of the fuel tank in a front/rear direction of the vehicle, and the part is disposed under an other end section of the fuel tank.

In such a straddle-type vehicle, the fuel tank is supported on the body frame such that the one end section of the fuel tank can turn. Furthermore, parts, such as the fuel injection device, are disposed under the other end section of the fuel tank, so that a working space is created above the fuel injection device when the fuel tank is turned.

That is, the user of the straddle-type vehicle can turn the fuel tank to easily carry out maintenance and cleaning of the upper portion of the engine and its peripheral parts, specifically, maintenance and cleaning of the fuel injection device and the fuel pump mounted in the fuel tank.

In one embodiment, the one end section is a front end section of the fuel tank.

In one embodiment, the part includes a fuel injection device connected to the engine. An air cleaner is disposed behind the fuel tank and connected to the fuel injection device. The other end section includes a rear end section at the rear end of the fuel tank. The fuel injection device is disposed under the rear end section.

In one embodiment, the fuel pump is mounted on the bottom of the fuel tank. The body frame includes two frame sections disposed in parallel along the width direction of the vehicle. The fuel pump is disposed in a region including a centerline of the vehicle between outer ends of the two frame sections.

In one embodiment, a fuel hose feeds fuel from the fuel pump to the fuel injection device. The fuel hose includes an upstream fuel hose and a downstream fuel hose connected by a fuel hose connector.

In one embodiment, the fuel tank support section includes a support section formed on the body frame, a front end section provided at the front end of the fuel tank, and a turning shaft attached to the support section along the width direction of the vehicle. A body frame-side bolt hole into which the turning shaft is inserted is formed in the support section. A tank-side bolt hole into which the turning shaft is inserted is formed in the front end section. The turning shaft is inserted into the body frame-side bolt hole and the tank-side bolt hole.

In one embodiment, an elastic member attached to the front end section is provided at the front end of the fuel tank. The support section is connected to the front end section via the elastic member.

In one embodiment, after the support section and the front end section are connected to each other with the turning shaft, the elastic member can slide against the support section.

In one embodiment, the fuel tank includes a rear end section to be connected to the body frame. A securing bolt secures the rear end section to the body frame. A securing bolt hole into which the securing bolt is screwed is formed in the body frame. The securing bolt is screwed into the securing bolt hole through the rear end section toward the underlying body frame.

According to the invention, a straddle-type vehicle is provided that has a fuel pump mounted in a fuel tank disposed above an engine and allows a user to more easily carry out maintenance and cleaning of the upper portion of the engine and its peripheral parts.

Other features and advantages of the invention will be apparent from the following detailed description, taken in conjunction with the accompanying drawings which illustrate, by way of example, various features of embodiments of the invention.

Figure 1:
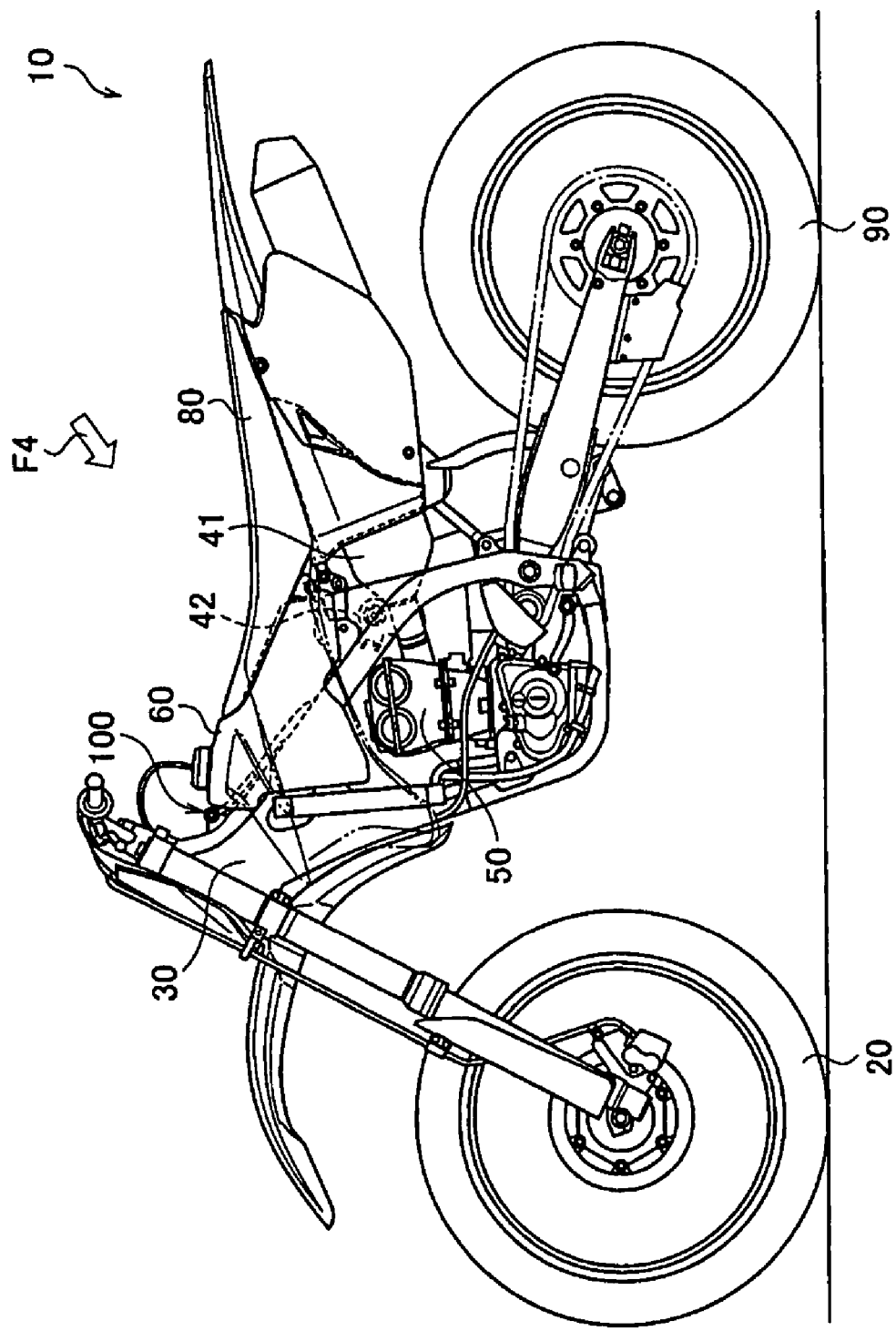
FIG. 1 is a left side view of a straddle-type vehicle according to an embodiment of the invention.

DETAILED DESCRIPTION OF THE INVENTION (Configuration of the Straddle-Type Vehicle)

Embodiments of a straddle-type vehicle according to the invention will now be described with reference to the drawings. In the drawings, same or similar portions have same or similar characters. The drawings are schematically drawn and dimensions and the like are not to scale. Specific dimensions should be judged taking the following description into account. Relationships and ratios between same dimensions in different figures may vary.

(1) Overall Schematic Configuration

FIG. 1 is a left side view of a motorcycle 10 that is a straddle-type vehicle according to this embodiment. Motorcycle 10 includes a front wheel 20 and a rear wheel 90. An engine 50 drives rear wheel 90.

Motorcycle 10 is a so-called straddle-type off-road vehicle optimized for off-road traveling. Engine 50 is a four-stroke engine mounted on a body frame 30. A fuel injection device 42 (a part) controlled by an ECU is connected to engine 50 and fuel pump 70 and not only injects fuel but also supplies air into engine 50 (cylinders). An air cleaner 41 is connected to and cleans air supplied to fuel injection device 42.

A fuel tank 60 stores fuel (gasoline) that will be supplied to fuel injection device 42. Fuel tank 60 is disposed above engine 50. A seat 80 on which a rider sits is provided on a rear portion of fuel tank 60.

A fuel tank support section 100 supports fuel tank 60 in such a way that fuel tank 60 can turn. Specifically, fuel tank support section 100 supports a front end section 60fe (one end section) of fuel tank 60. Fuel tank 60 can turn on fuel tank support section 100 (specifically, a connection bolt 62 shown in FIG. 2) in such a way that a rear end section 60re of fuel tank 60 swings toward the front of motorcycle 10. The specific configuration of fuel tank support section 100 will be described later.

(2) Configuration of the Fuel Tank and its Peripheral Parts

The configuration of fuel tank 60 and its peripheral parts is described with reference to FIGS. 2-6. As described above, fuel tank 60 can turn on the fuel tank support section 100.

(2.1) Configuration of the Fuel Tank

Figure 2:
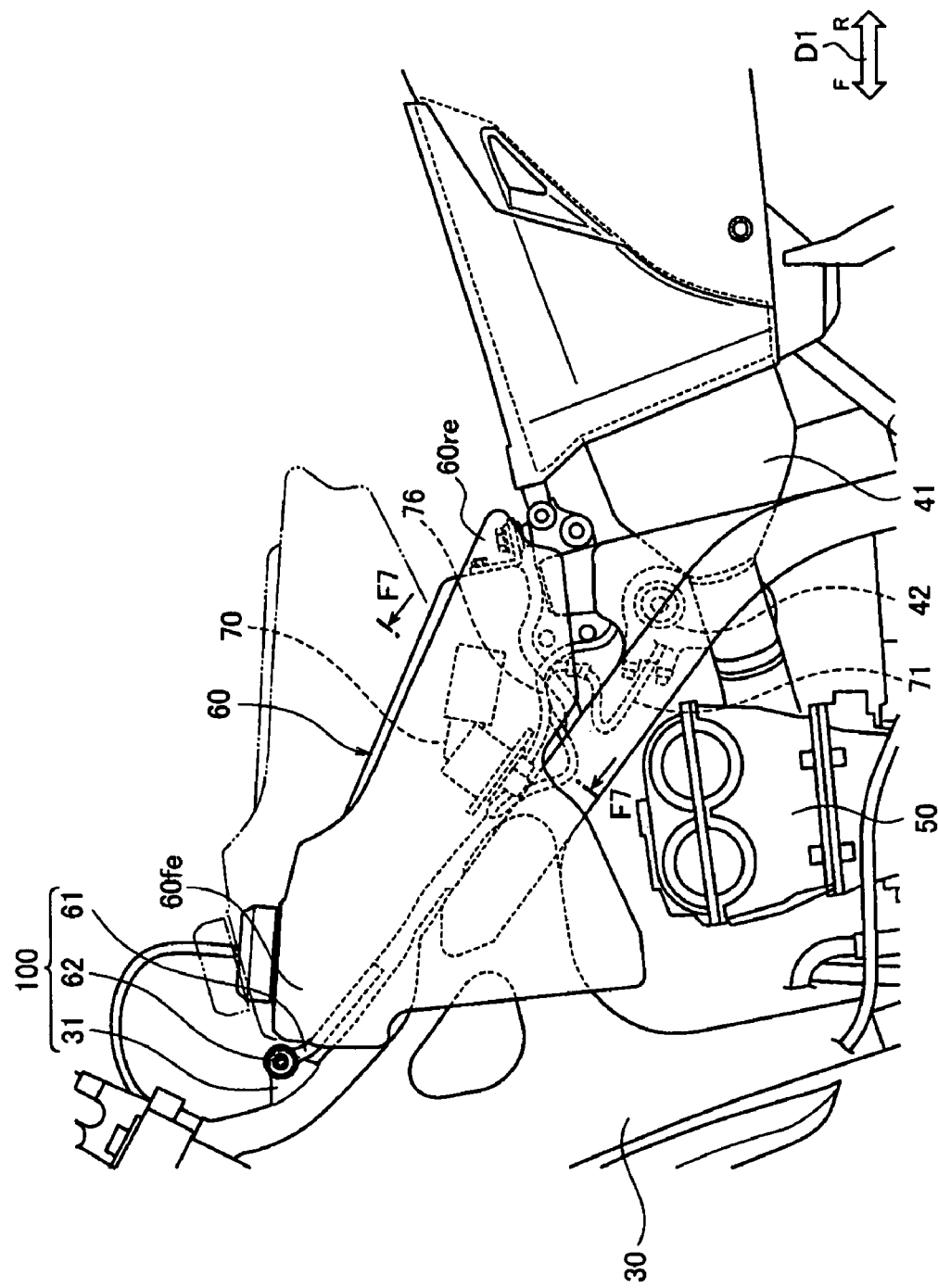
FIG. 2 is a left side view of a fuel tank and its peripheral parts according to an embodiment of the invention.
Figure 3:
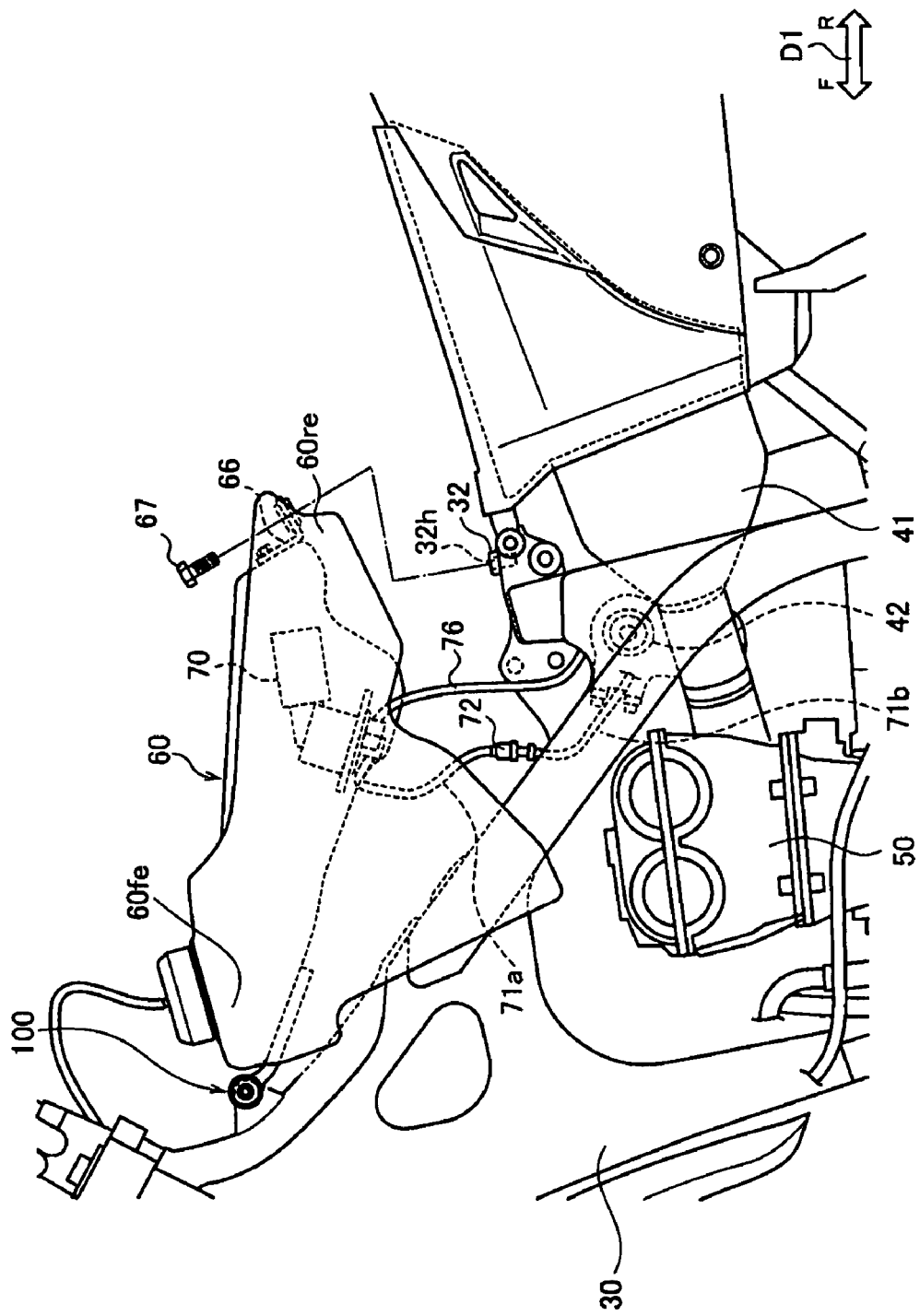
FIG. 3 is a left side view of the fuel tank and its peripheral parts when the fuel tank is turned.
Figure 4:
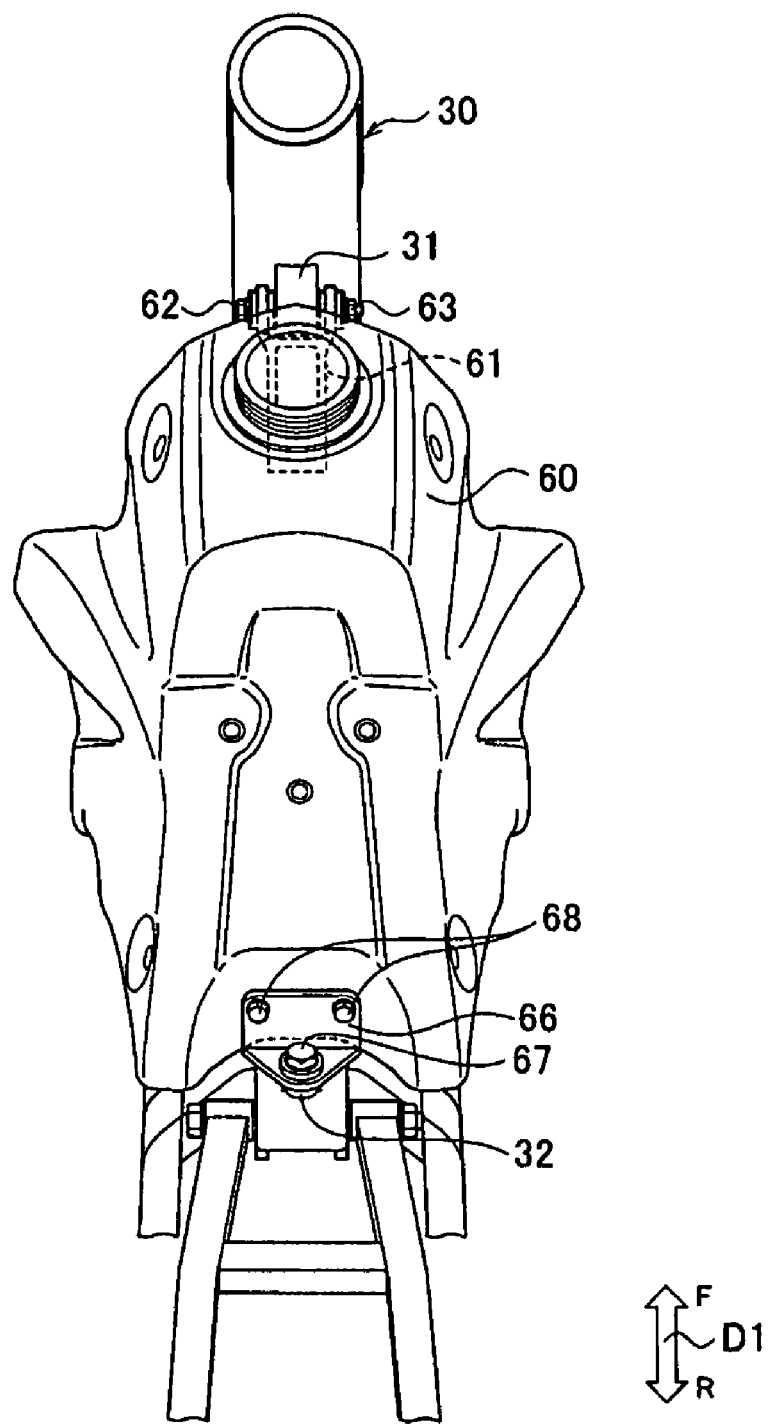
FIG. 4 is a view of the fuel tank and its peripheral parts in the direction F4 of FIG. 1.

FIG. 2 is a left side view of fuel tank 60 and its peripheral parts. FIG. 3 is a left side view of fuel tank 60 and its peripheral parts when fuel tank 60 is turned. FIG. 4 is a view of fuel tank 60 and its peripheral parts in direction F4 shown in FIG. 1.

Fuel tank support section 100 includes a projection 31 (support section) formed on body frame 30, a front end tank bracket 61 and a connection bolt 62 (turning shaft). Front end tank bracket 61 is provided at front end section 60fe of fuel tank 60. Connection bolt 62 is attached to projection 31 along the width direction of the vehicle (direction D2 of FIG. 6) and is used as a turning shaft to turn fuel tank 60 such that rear end section 60re swings toward the front of motorcycle 10.

A fuel pump 70 is mounted on bottom 60b of fuel tank 60. Fuel pump 70 discharges fuel stored in fuel tank 60 into a fuel hose 71 under high pressure. A set of harness lines 76 including a power supply line is connected to fuel pump 70. As shown in FIG. 3, fuel hose 71 and harness 76 have extra length so that large tension is not applied to them when fuel tank 60 is turned.

Fuel hose 71 is connected to fuel pump 70 and fuel injection device 42 and feeds pressurized fuel discharged from fuel pump 70 to fuel injection device 42. As shown in FIG. 3, fuel hose 71 includes an upstream fuel hose 71a and a downstream fuel hose 71b connected by a fuel hose connector 72 under rear end section 60re of fuel tank 60.

Fuel hose connector 72 has a slide lock mechanism (not shown) by which fuel hose connector 72 will not disengage due to the pressure of fuel flowing through fuel hose 71. The slide lock mechanism is unlocked to disengage upstream fuel hose 71a from downstream fuel hose 71b.

Fuel injection device 42 is disposed under rear end section 60re (other end section) of fuel tank 60.

Fuel tank support section 100 connects body frame 30 to one end section of fuel tank 60, specifically, front end section 60fe, which is an end section in the front/rear direction of the vehicle (direction D1). That is, fuel tank support section 100 is provided at front end section 60fe of fuel tank 60.

As shown in FIG. 4, a rear end tank bracket 66 is provided at rear end section 60re of fuel tank 60 and attached to fuel tank 60 using attachment bolts 68. A bolt hole 32h (securing bolt hole) into which a securing bolt 67 is screwed is formed in body frame 30. Specifically, a truncated cone-like bolt receptor 32 that projects from the other portions is formed on body frame 30. Bolt hole 32h is formed in bolt receptor 32. Securing bolt 67 is screwed into bolt hole 32h through a bolt hole (not shown) formed in rear end tank bracket 66, so that rear end tank bracket 66 is connected to body frame 30.

(2.2) Detailed Configuration of the Fuel Tank Support Section

Figure 5:
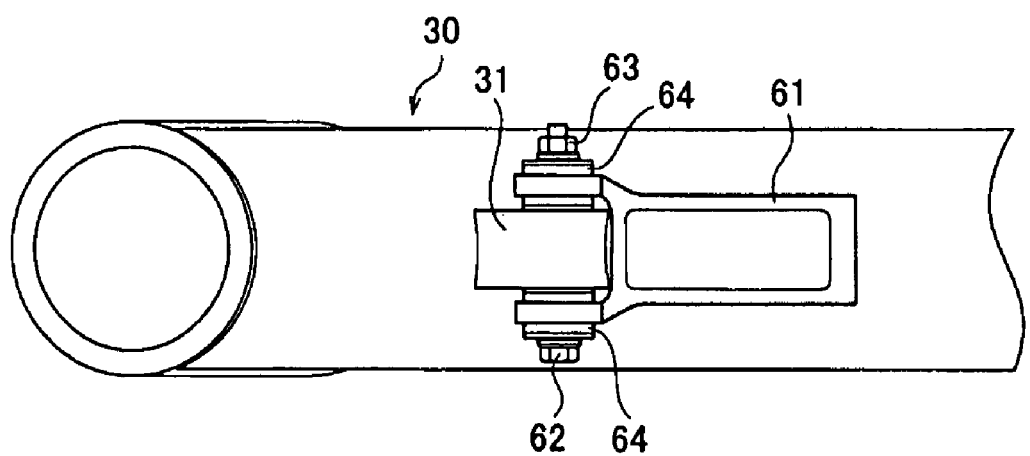
FIG. 5 is an enlarged plan view of a fuel tank support section according to an embodiment of the invention.
Figure 6:
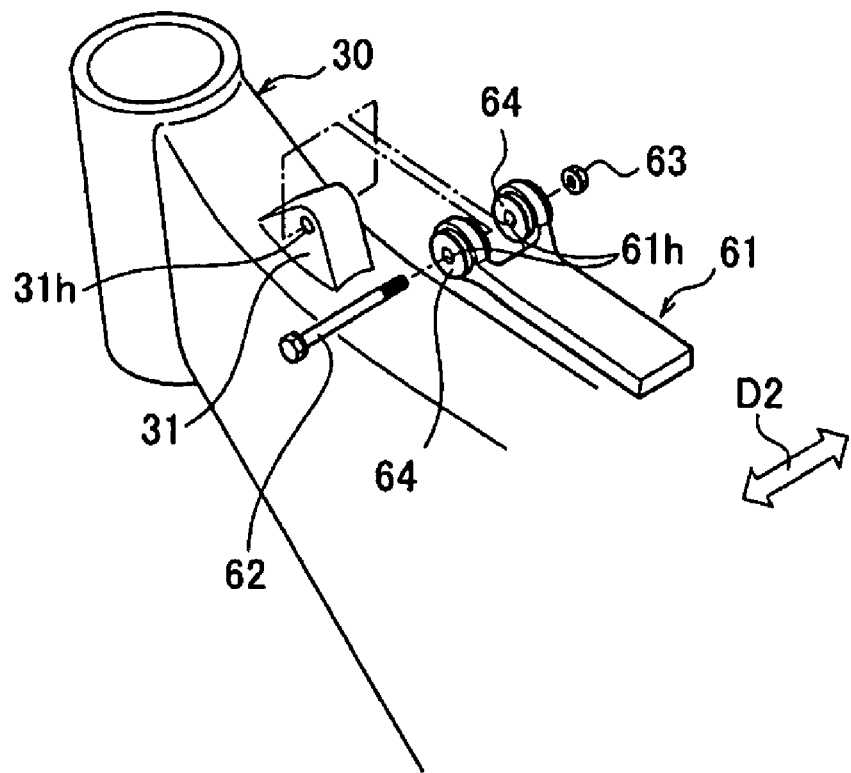
FIG. 6 is an enlarged perspective view of the fuel tank support section.

The detailed configuration of fuel tank support section 100 is now described. FIG. 5 is an enlarged plan view of fuel tank support section 100. FIG. 6 is an enlarged perspective view of fuel tank support section 100.

As shown in FIGS. 5 and 6, projection 31 is connected to front end tank bracket 61 via grommets 64. Grommets 64 are made of an elastic material, such as rubber, and attached to front end tank bracket 61. When projection 31 is connected to front end tank bracket 61 with connection bolt 62 and a nut 63, grommets 64 slide against projection 31 so that fuel tank 60 freely turns on connection bolt 62. Since grommets 64 are made of rubber and are in contact with projection 31 to the extent that grommets 64 slide against projection 31, there is no play when fuel tank 60 is turned.

Bolt holes 61h (tank-side bolt holes) through which connection bolt 62 is inserted are formed in front end tank bracket 61. A bolt hole 31h (frame-side bolt hole) through which connection bolt 62 is inserted is also formed in projection 31. Connection bolt 62 is inserted through bolt holes 61h and bolt hole 31h and then screwed into nut 63.

(3) Installation of the Fuel Pump

Figure 7:
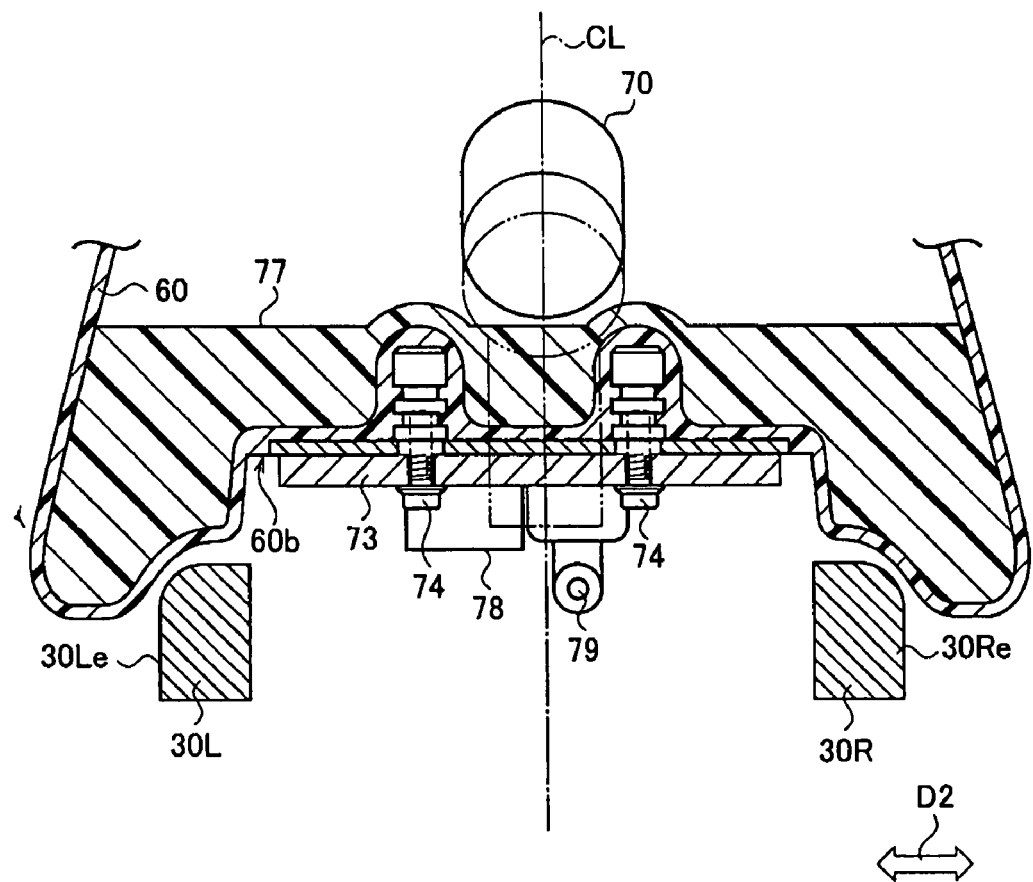
FIG. 7 is a cross-sectional view taken along line F7-F7 of FIG. 2.

Installation of fuel pump 70 is described with reference to FIG. 7, which is a cross-sectional view taken along line F7-F7 of FIG. 2. As shown in FIG. 7, fuel pump 70 is disposed at the center of bottom 60b of fuel tank 60, specifically, at the position including centerline CL of the vehicle. Fuel pump 70 is mounted at bottom 60b of fuel tank 60 via an attachment seat 73 and secured to bottom 60b using bolts 74. Fuel pump 70 is also supported on a support plate 77 interposed between fuel pump 70 and bottom 60b.

Fuel pump 70 is provided with a wiring coupler connector 78 connected to a wiring coupler provided at the end of harness 76 and a fuel outlet 79 connected to fuel hose 71 (see FIG. 3).

At the position where fuel pump 70 is disposed, body frame 30 includes a left frame section 30L and a right frame section 30R disposed in parallel along the width direction of the vehicle (direction D2). In a cross section taken along the width direction of the vehicle, fuel pump 70 is disposed in the region including centerline CL of the vehicle between outer end 30Le of left frame section 30L and outer end 30Re of right frame section 30R.

(Effects/Advantages)

According to motorcycle 10, fuel tank 60 is supported on body frame 30 such that fuel tank 60 can turn on connection bolt 62 situated at front end section 60fe of fuel tank 60. Since fuel injection device 42 to which fuel hose 71 is connected is disposed under rear end section 60re of fuel tank 60, a working space is created above fuel injection device 42 when fuel tank 60 is turned.

Accordingly, fuel tank 60 can be turned to easily carry out maintenance and cleaning of the upper portion of engine 50 and its peripheral parts, such as fuel injection device 42, fuel pump 70 mounted on bottom 60b of fuel tank 60, and fuel hose 71 connected to fuel pump 70.

In this embodiment, air cleaner 41 is disposed behind fuel tank 60, fuel injection device 42 is disposed under rear end section 60re of fuel tank 60, and fuel tank support section 100 is provided at front end section 60fe of fuel tank 60. That is, fuel tank 60, fuel injection device 42 and air cleaner 41 are disposed in this order along a direction from front to rear of motorcycle 10, so that fuel injection device 42 is situated between fuel tank 60 and air cleaner 41. This configuration simplifies the shape of the connection path of fuel hose 71 that connects fuel pump 70 to fuel injection device 42 as well as the shape of the intake path from air cleaner 41 to fuel injection device 42.

In this embodiment, in a cross section taken along the width direction of the vehicle, fuel pump 70 is disposed in the region including centerline CL of the vehicle between outer end 30Le of left frame section 30L and outer end 30Re of right frame section 30R. Thus, even when motorcycle 10 rolls over, fuel pump 70 will not likely be damaged.

In this embodiment, fuel hose connector 72 is provided at some point along fuel hose 71. Thus, even when fuel tank 60 is removed from motorcycle 10, fuel hose 71 can be easily disengaged from fuel injection device 42. Furthermore, fuel hose connector 72 is provided under rear end section 60re of fuel tank 60. Thus, the user of motorcycle 10 can turn fuel tank 60 to easily access fuel hose connector 72.

In this embodiment, front end tank bracket 61 is connected to single projection 31 formed integrally with body frame 30. Thus, fuel tank 60 can be reliably and firmly connected to body frame 30 having a simplified configuration.

In this embodiment, grommets 64 can slide against projection 31 after front end tank bracket 61 is connected to projection 31 with connection bolt 62. Thus, fuel tank 60 can freely turn on connection bolt 62. Since grommets 64 are made of rubber and in contact with projection 31 to the extent that grommets 64 slide against projection 31, there will be no play when fuel tank 60 is turned.

In this embodiment, rear end tank bracket 66 to be connected to body frame 30 is provided at rear end section 60re of fuel tank 60. Securing bolt 67 that secures rear end tank bracket 66 is screwed into bolt hole 32h through rear end tank bracket 66 toward underlying body frame 30. The large working space above body frame 30 allows securing bolt 67 to be easily attached and detached, thereby releasing rear end section 60re of fuel tank 60 so that fuel tank 60 can be turned.

Furthermore, since bolt hole 32h is formed in a vertical direction, a screw driver or the like inserted into bolt hole 32h can support rear end section 60re of the turned fuel tank 60. Thus, the turned fuel tank 60 can be supported without a dedicated support stay or the like.

(Other Embodiments)

Although one embodiment of the invention is described above, the description and the drawings that form part of the disclosure should not be construed to limit the invention. Various alternative embodiments will be apparent to those skilled in the art from the disclosure.

For example, in the embodiment described above, although fuel tank support section 100 is provided at front end section 60fe of fuel tank 60, fuel tank support section 100 may be provided at rear end section 60re of fuel tank 60 and fuel injection device 42 may be disposed under front end section 60fe of fuel tank 60 according to the shape of the engine and the like.

Moreover, although front end tank bracket 61 is described as connected to single projection 31 formed integrally with body frame 30, the connection of front end tank bracket 61 to body frame 30 is not limited thereto. For example, two projections similar to projection 31 may be formed on body frame 30 along the width direction of the vehicle instead of a single projection 31, and the front end tank bracket may be formed into a shape that is inserted between the two projections.

Fuel hose connector 72 may not necessarily be provided. Furthermore, fuel pump 70 may not necessarily be disposed in the region including centerline CL of the vehicle between outer end 30Le of left frame section 30L and outer end 30Re of right frame section 30R.

As described above, the invention of course includes various embodiments that are not described herein. The range of the invention shall be therefore defined only by the following claims.

The invention claimed is:

1. A straddle-type vehicle comprising:
   an engine;
   a body frame on which the engine is mounted;
   a fuel tank disposed above the engine;
   a fuel pump mounted in the fuel tank;
   a part connected to the fuel pump, and
   a fuel tank support section that supports the fuel tank such that the fuel tank can turn about the fuel tank support section; wherein
   the fuel tank support section supports one end section of the fuel tank in a front/rear direction of the vehicle, and the part is disposed under an other end section of the fuel tank,
   the one end section is a front end section of the fuel tank, and
   the other end section is in a rear portion of the fuel tank and is spaced apart from the one end section by a certain distance, wherein the fuel tank support section comprises: a support section formed in the body frame; the front end section provided at the front end of the fuel tank; and a turning shaft attached to the support section along the width direction of the vehicle, wherein a body frame-side bolt hole into which the turning shaft is inserted is formed in the support section, a tank-side bolt hole into which the turning shaft is inserted is formed in the front end section, and the turning shaft is inserted into the body frame-side bolt hole and the tank-side bolt hole.

2. The straddle-type vehicle according to claim 1, wherein:
the part includes a fuel injection device connected to the engine,
the straddle-type vehicle further comprises an air cleaner disposed behind the fuel tank and connected to the fuel injection device,
the other end section includes a rear end section provided at the rear end of the fuel tank, and
the fuel injection device is disposed under the rear end section.

3. The straddle-type vehicle according to claim 1, wherein:
the fuel pump is mounted on the bottom of the fuel tank,
the body frame includes two frame sections disposed in parallel along the width direction of the vehicle, and
the fuel pump is disposed in a region including a centerline of the vehicle between outer ends of the two frame sections.

4. The straddle-type vehicle according to claim 1 further comprising:
a fuel hose that feeds fuel from the fuel pump to the fuel injection device
the fuel hose comprising an upstream fuel hose and a downstream fuel hose; and
a fuel hose connector that connects the upstream fuel hose to the downstream fuel hose.

5. The straddle-type vehicle according to claim 1 further comprising:
an elastic member attached to the front end section provided at the front end of the fuel tank, wherein
the support section is connected to the front end section via the elastic member.

6. The straddle-type vehicle according to claim 5, wherein after the support section and the front end section are connected to each other with the turning shaft,
the elastic member can slide against the support section.

7. The straddle-type vehicle according to claim 5, wherein the fuel tank includes a rear end section to be connected to the body frame,
the straddle-type vehicle further comprises a securing bolt that secures the rear end section to the body frame,
a securing bolt hole into which the securing bolt is screwed is formed in the body frame, and
the securing bolt is screwed into the securing bolt hole through the rear end section toward the underlying body frame.

8. A straddle-type vehicle comprising:
an engine;
a body frame on which the engine is mounted;
a fuel tank disposed above the engine;
a fuel pump mounted in the fuel tank;
a part connected to the fuel pump; and
a fuel tank support section that supports the fuel tank such that the fuel tank can turn about the fuel tank support section, wherein the fuel tank support section comprises: a support section formed in the body frame; the front end section provided at the front end of the fuel tank; and a turning shaft attached to the support section along the width direction of the vehicle, wherein a body frame-side bolt hole into which the turning shaft is inserted is formed in the support section, a tank-side bolt hole into which the turning shaft is inserted is formed in the front end section, and the turning shaft is inserted into the body frame-side bolt hole and the tank-side bolt hole, wherein the fuel tank support section supports one end section of the fuel tank in a front/rear direction of the vehicle, and the part is disposed under an other end section of the fuel tank, and
the one end section or the other end section is positioned in a front portion of the fuel tank, and the other of the one end section and the other end section is positioned in a rear portion of the fuel tank.

* * * * *